(12) United States Patent
Lynn

(10) Patent No.: US 8,250,589 B2
(45) Date of Patent: Aug. 21, 2012

(54) METHOD FOR SIMPLIFYING INTERFACES HAVING DYNAMIC LIBRARIES

(75) Inventor: James A. Lynn, Rose Hill, KS (US)

(73) Assignee: LSI Corporation, Milpitas, CA (US)

( * ) Notice: Subject to any disclaimer, the term of this patent is extended or adjusted under 35 U.S.C. 154(b) by 667 days.

(21) Appl. No.: 12/384,359

(22) Filed: Apr. 3, 2009

(65) Prior Publication Data
US 2010/0257546 A1    Oct. 7, 2010

(51) Int. Cl.
*G06F 3/00* (2006.01)
(52) U.S. Cl. .................................................. 719/321
(58) Field of Classification Search .................. 719/331, 719/332
See application file for complete search history.

(56) References Cited

U.S. PATENT DOCUMENTS 5,297,284 A * 3/1994 Jones et al. ................ 717/137
8,060,460 B2 * 11/2011 Tzruya et al. ............... 706/62
2002/0040410 A1 * 4/2002 Leach et al. ................ 709/315
2005/0251809 A1 * 11/2005 Gunduc et al. ............. 719/310
2008/0163265 A1 * 7/2008 Flora .......................... 719/328

OTHER PUBLICATIONS

David L. Levine, Object Lifetime Manager, A complementary Pattern for Controlling Object Creation andDestruction, Jan. 9, 2000.*

* cited by examiner

*Primary Examiner* — Lechi Truong
(74) *Attorney, Agent, or Firm* — Suiter Swantz pc llo

(57) ABSTRACT

A method may include defining an interface class including a static member having an implementation pointer. The method may also include loading a main code segment including a stub implementation of the interface class. Additionally, the method may include instantiating the stub implementation of the interface class to provide a stub implementation object. The stub implementation of the interface class may include a first constructor configured to set the implementation pointer to the stub implementation object. Further, the method may include loading a dynamic library including a real implementation of the interface class. Still further, the method may include instantiating the real implementation of the interface class to provide a real implementation object. The real implementation of the interface class may include a second constructor configured to set the implementation pointer to the real implementation object.

12 Claims, 4 Drawing Sheets

METHOD FOR SIMPLIFYING INTERFACES HAVING DYNAMIC LIBRARIES

TECHNICAL FIELD

The present disclosure generally relates to the field of computer programming, and more particularly to a system, method, and computer program product for simplifying interfaces having dynamic libraries.

BACKGROUND

Dynamic libraries may be utilized to avoid loading code into memory until that code is required for the execution of a computer program. Linkers that include weak symbol linkage functionality allow the main code of a computer program to reference symbols in a dynamic library without causing a link-time error. However, this type of linker then may then require code which references these symbols to check for a run-time error when utilizing a symbol. In addition, some linkers do not support weak symbol linkage, and/or weak symbol linkage may be disabled in some environments. In these cases, the main code segment of a computer program may not be able to reference symbols in a dynamic library without causing a link-time error.

Alternatively, another approach may require all of the symbols in a dynamic library that can be referenced by the main code to be included in a symbol table. In this implementation, the main code then utilizes symbol table lookup routines when referencing these symbols to check for their existence. Then, when a required symbol is found, it may be accessed through a pointer to avoid a link-time error. This technique may introduce unnecessary complexity to a computer programming environment, while increasing the size of the symbol table, and requiring extra run-time checks to perform and check the results of symbol table lookups.

SUMMARY

A method may include defining an interface class including a static member having an implementation pointer. The method may also include loading a main code segment including a stub implementation of the interface class. Additionally, the method may include instantiating the stub implementation of the interface class to provide a stub implementation object. The stub implementation of the interface class may include a first constructor configured to set the implementation pointer to the stub implementation object. Further, the method may include loading a dynamic library including a real implementation of the interface class. Still further, the method may include instantiating the real implementation of the interface class to provide a real implementation object. The real implementation of the interface class may include a second constructor configured to set the implementation pointer to the real implementation object.

A computer programming product may include a signal bearing medium bearing one or more instructions for defining an interface class including a static member having an implementation pointer. The computer programming product may also include one or more instructions for loading a main code segment including a stub implementation of the interface class. Additionally, the computer programming product may include one or more instructions for instantiating the stub implementation of the interface class to provide a stub implementation object. The stub implementation of the interface class may include a first constructor configured to set the implementation pointer to the stub implementation object. Further, the computer programming product may include one or more instructions for loading a dynamic library including a real implementation of the interface class. Still further, the computer programming product may include one or more instructions for instantiating the real implementation of the interface class to provide a real implementation object. The real implementation of the interface class may include a second constructor configured to set the implementation pointer to the real implementation object.

A system may include a computing device and instructions that when executed on the computing device cause the computing device to define an interface class including a static member having an implementation pointer. The system may also include instructions that when executed on the computing device cause the computing device to load a main code segment including a stub implementation of the interface class. Additionally, the system may include instructions that when executed on the computing device cause the computing device to instantiate the stub implementation of the interface class to provide a stub implementation object. The stub implementation of the interface class may include a first constructor configured to set the implementation pointer to the stub implementation object. Further, the system may include instructions that when executed on the computing device cause the computing device to load a dynamic library including a real implementation of the interface class. Still further, the system may include instructions that when executed on the computing device cause the computing device to instantiate the real implementation of the interface class to provide a real implementation object. The real implementation of the interface class may include a second constructor configured to set the implementation pointer to the real implementation object.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
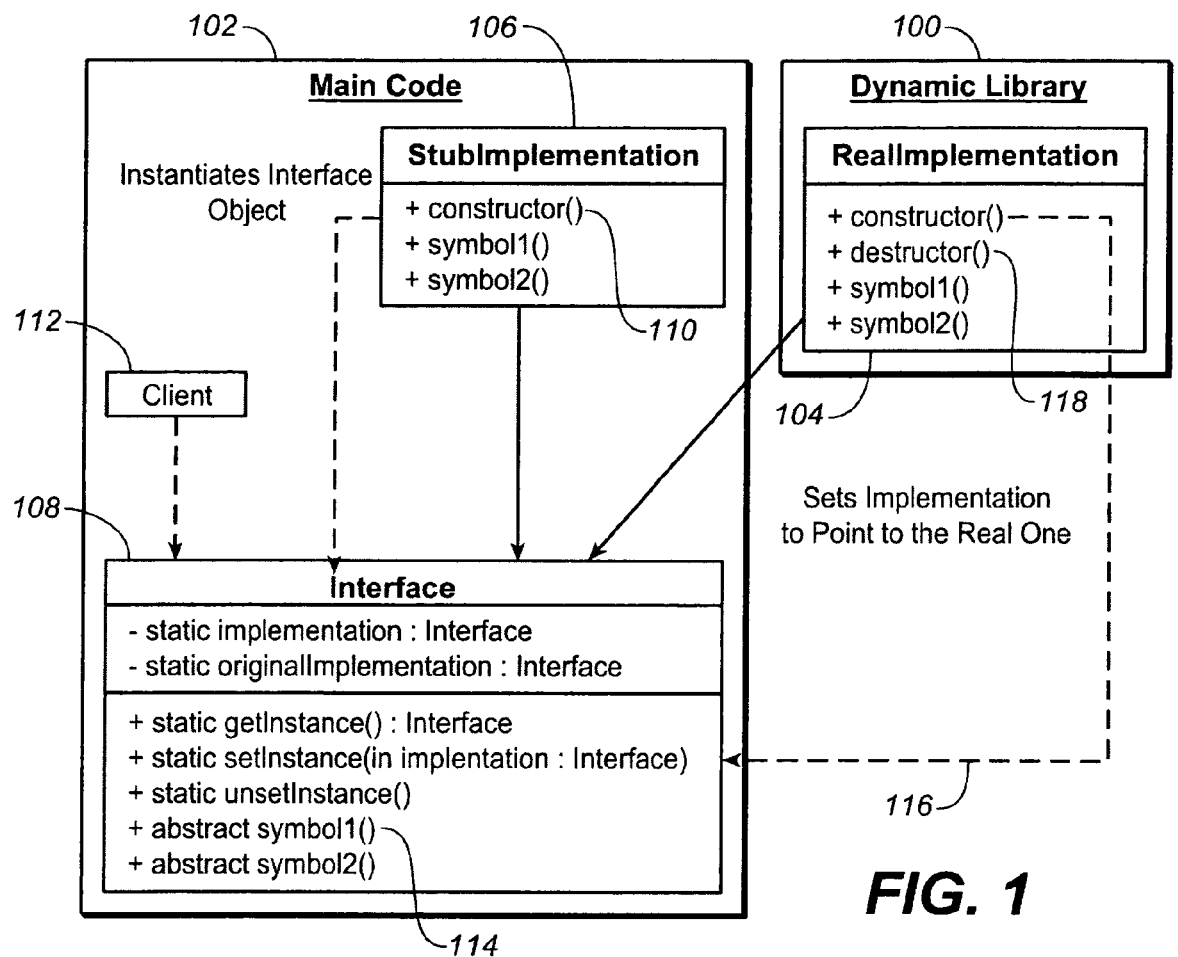
FIG. 1 is a class diagram illustrating a number of classes in accordance with the present disclosure.
Figure 2:
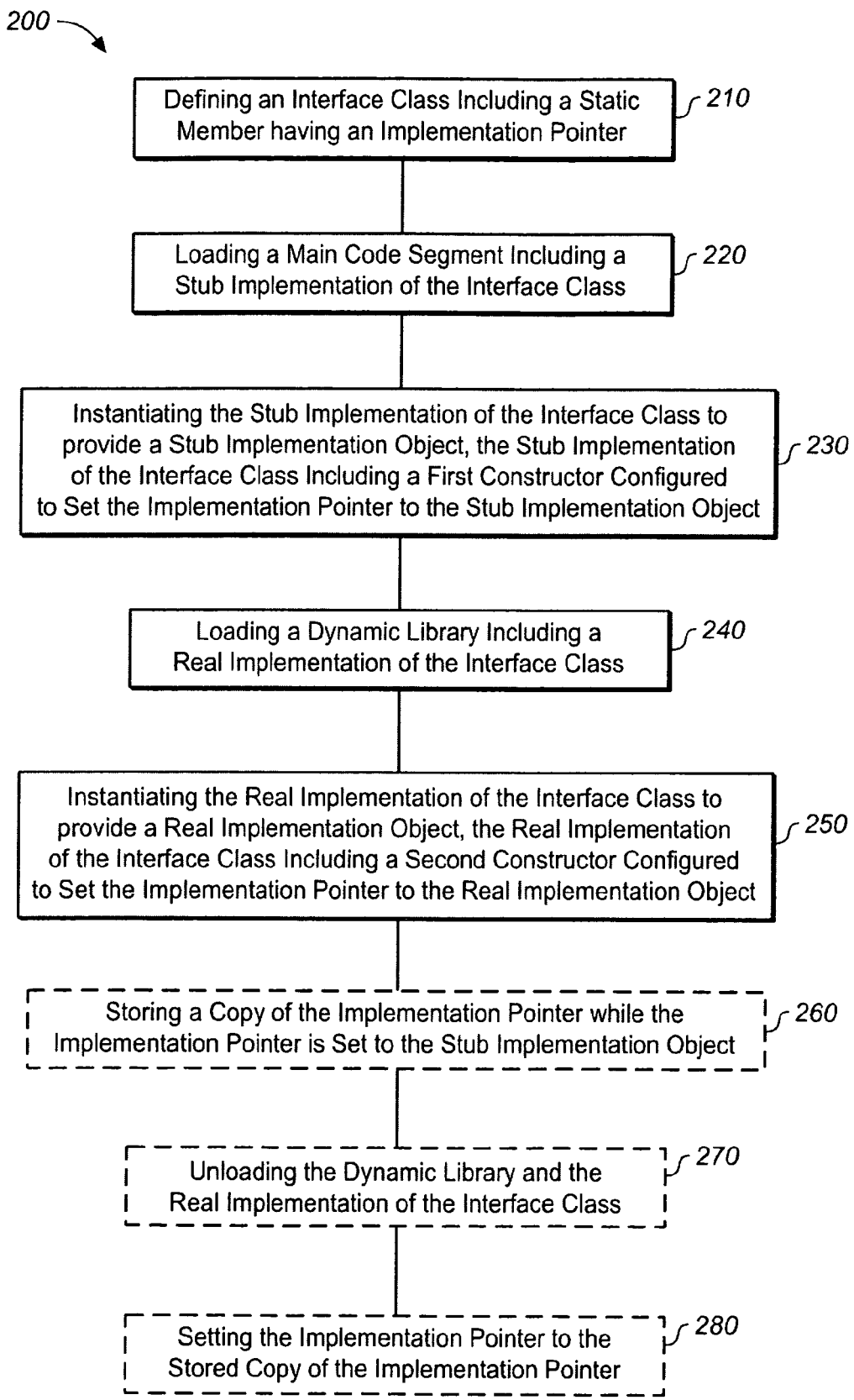
FIG. 2 is flow diagram illustrating a method in accordance with the present disclosure.

Referring generally to FIGS. 1 through 2, a method 200 is described in accordance with the present disclosure. In general terms, method 200 utilizes C++ inheritance techniques combined with an enhanced singleton pattern (with a modifiable implementation pointer). In this manner, method 200 may provide access to dynamic library symbols, even when a particular library is not yet loaded. For example, the symbols in a dynamic library 100 which need to be accessed by a main code segment 102 may be included as members of an abstract C++ singleton interface class. The dynamic library 100 includes one C++ singleton class containing a real implementation 104 of the interface 108, and the main code segment 102 includes another C++ singleton class containing a stub implementation 106 of the interface 108. As in a singleton design pattern, a static member of the interface class contains a pointer to the implementation class. Initially, this pointer points to a stub implementation object, but when the dynamic library 100 is loaded, a constructor modifies the pointer to point to a real implementation object from the dynamic library 100.

It should be noted that the following description utilizes C++ syntax and structure with some specificity. For example, the following description includes an interface class which is described as an enhanced singleton interface class. More specifically, this enhanced singleton interface class is implemented as an abstract C++ singleton interface class. However, it will be appreciated that this description is provided by way of explanation, and is not meant to be restrictive of the present disclosure. For instance, while the description below references C++, any programming language that utilizes encapsulation and/or includes inheritance features similar to C++ could be utilized with the present disclosure. In one particular embodiment, the C programming language may be utilized. In a C implementation, the stub implementation described below may include a first array of pointers, while the real implementation may include a second array of pointers (where one pointer is utilized in place of each symbol). In this implementation, each symbol would then be accessed by indexing the array.

Referring now to method 200 (and with specific attention to the class diagram shown in FIG. 1 illustrating these relationships), first, the interface class 108 including a static member having an implementation pointer is defined, 210. Then, before the dynamic library 100 is loaded, the main code segment 102 including the stub implementation 106 of the interface class 108 is loaded, 220. Next, the stub implementation 106 is instantiated to provide a stub implementation object. The stub implementation 106 of the interface class 108 includes a first constructor 110 configured to set the implementation pointer to the stub implementation object, 230. For instance, as in the standard singleton pattern, the first constructor 110 may utilize "Interface::setInstance( )" to set the implementation pointer to point to the implementation object (in this case, the StubImplementation object). Then, when a client 112 accesses a symbol 114, the client 112 may utilize the syntax "Interface::getInstance( )→symbol1( )." In this case, the routine that is actually called is "StubImplementation::symbol1( )."

At some point, the dynamic library 100 including the real implementation 104 of the interface class 108 is loaded, 240. Then, the real implementation 104 is instantiated to provide a real implementation object. The real implementation 104 of the interface class 108 includes a second constructor 116 configured to set the implementation pointer to the real implementation object, 250. For example, the second constructor 116 may utilize "Interface::setInstance( )" to set the implementation pointer to point to the RealImplementation object. Subsequently, when the client 112 utilizes the syntax "Interface::getInstance( )→symbol1( )," the routine that is actually called is "RealImplementation::symbol1( )."

Before the second constructor 116 sets the implementation pointer to the real implementation object (see method 200, step 250), a copy of the implementation pointer may be stored while the implementation pointer is set to the stub implementation object, 260. If, at some later time, the dynamic library 100 is unloaded, the RealImplementation's destructor 118 may utilize a syntax such as "Interface::unsetInstance( )" to restore the interface pointer to its original value. For instance, the dynamic library and the real implementation of the interface class may be unloaded, 270. Then, the implementation pointer may be set to the stored copy of the implementation pointer, 280. In one embodiment, the Implementation::originalImplementation pointer is utilized. In this embodiment, it was previously assigned by the first invocation of "Interface::setInstance( )."

Figure 3:
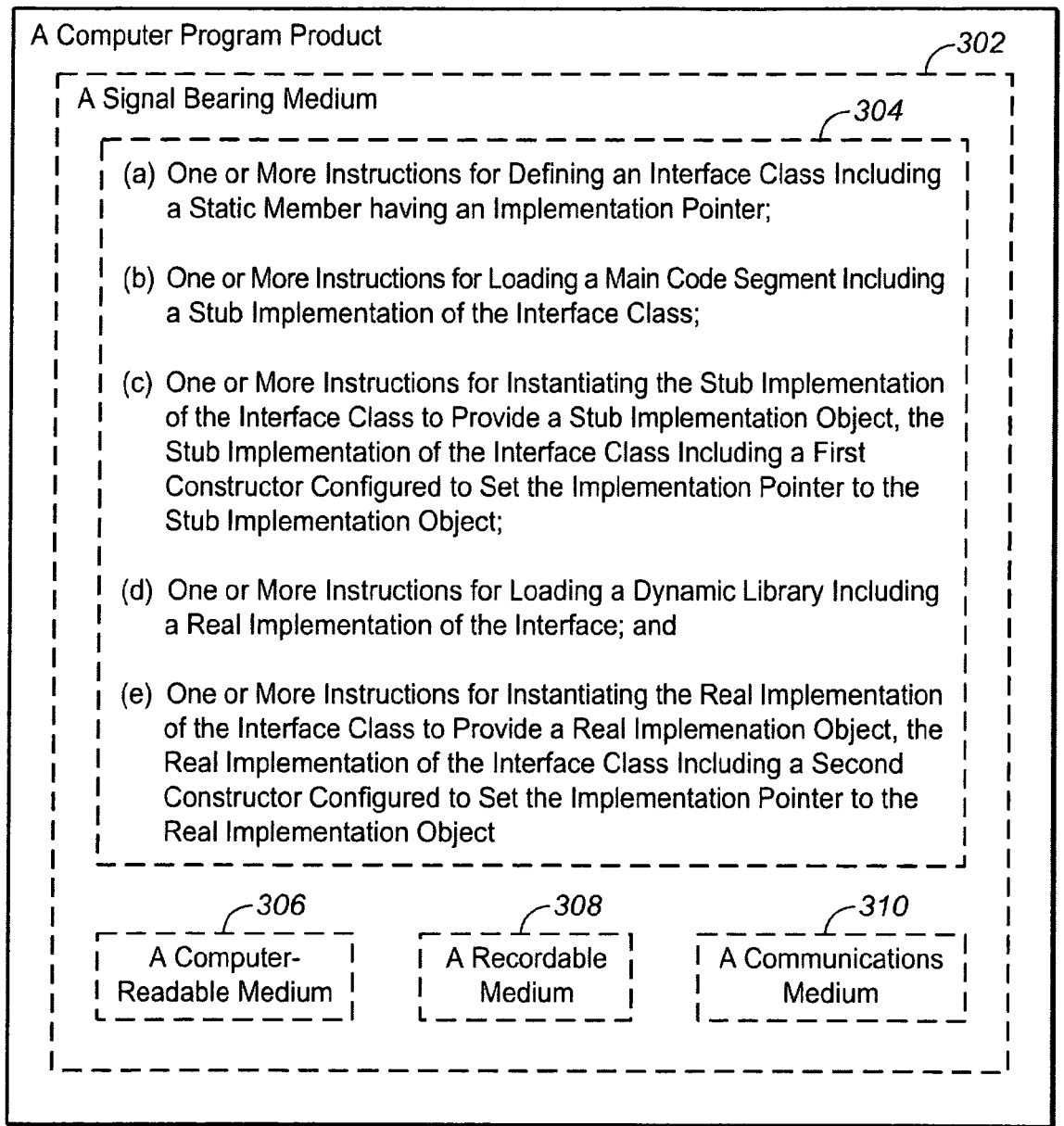
FIG. 3 is a partial view of a computer program product in accordance with the present disclosure.

FIG. 3 illustrates a partial view of an example computer program product 300 that includes a computer program 304 for executing a computer process on a computing device. An embodiment of the example computer program product 300 is provided using a signal-bearing medium 302, and may include one or more instructions for defining an interface class including a static member having an implementation pointer; loading a main code segment including a stub implementation of the interface class; instantiating the stub implementation of the interface class to provide a stub implementation object, the stub implementation of the interface class including a first constructor configured to set the implementation pointer to the stub implementation object; loading a dynamic library including a real implementation of the interface class; and instantiating the real implementation of the interface class to provide a real implementation object, the real implementation of the interface class including a second constructor configured to set the implementation pointer to the real implementation object. The one or more instructions may be, for example, computer executable and/or logic-implemented instructions. In one implementation, the signal-bearing medium 302 may include a computer-readable medium 306. In one implementation, the signal bearing medium 302 may include a recordable medium 308. In one implementation, the signal bearing medium 302 may include a communications medium 310.

Figure 4:
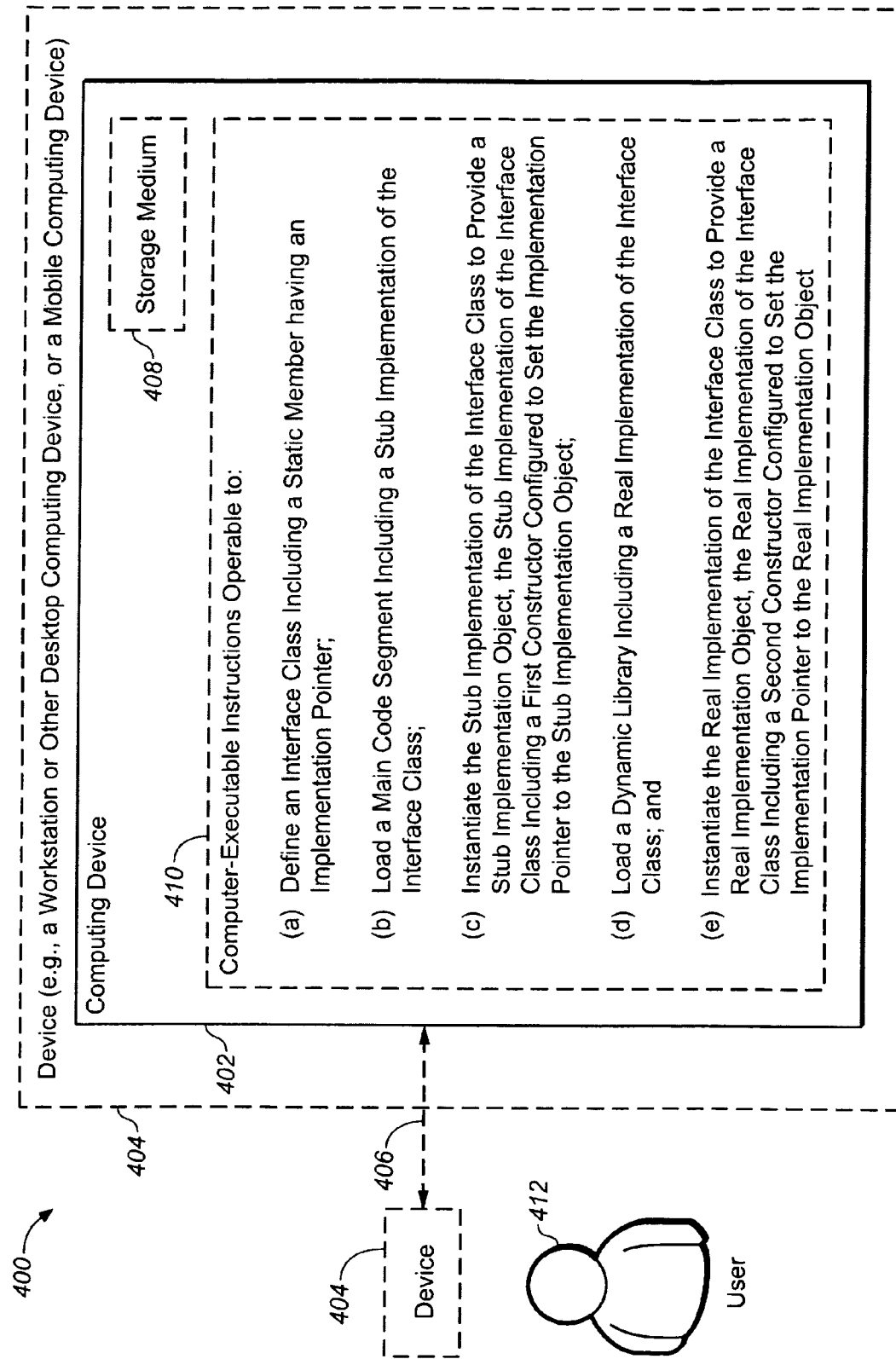
FIG. 4 is a partial view of an example system in accordance with the present disclosure.

FIG. 4 illustrates an example system 400 in which embodiments may be implemented. The system 400 includes a computing system environment. The system 400 also illustrates the user 412 using a device 404, which is optionally shown as being in communication with a computing device 402 by way of an optional coupling 406. The optional coupling 406 may represent a local, wide-area, or peer-to-peer network, or may represent a bus that is internal to a computing device (e.g., in example embodiments in which the computing device 402 is contained in whole or in part within the device 404). A storage medium 408 may be any computer storage media.

The computing device 402 includes computer-executable instructions 410 that when executed on the computing device 402 cause the computing device 402 to define an interface class including a static member having an implementation pointer; load a main code segment including a stub implementation of the interface class; instantiate the stub implementation of the interface class to provide a stub implementation object, the stub implementation of the interface class including a first constructor configured to set the implementation pointer to the stub implementation object; load a dynamic library including a real implementation of the interface class; and instantiate the real implementation of the interface class to provide a real implementation object, the real implementation of the interface class including a second constructor configured to set the implementation pointer to the real implementation object. As referenced above and as shown in FIG. 4, in some examples, the computing device 402 may optionally be contained in whole or in part within the device 404.

In FIG. 4, then, the system 400 includes at least one computing device (e.g., 402 and/or 404). The computer-executable instructions 410 may be executed on one or more of the at least one computing device. For example, the computing device 402 may implement the computer-executable instructions 410 and output a result to (and/or receive data from) the computing device 404. Since the computing device 402 may be wholly or partially contained within the computing device 404, the device 404 also may be said to execute some or all of the computer-executable instructions 410, in order to be caused to perform or implement, for example, various ones of the techniques described herein, or other techniques.

The device 404 may include, for example, a portable computing device, workstation, or desktop computing device. In another example embodiment, the computing device 402 is operable to communicate with the device 404 associated with the user 412 to receive information about the input from the user 412 for performing data access and data processing and presenting an output of a simplified interface having a dynamic library at least partly based on the user data.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
loading a main code segment, the main code segment including a first interface class
containing a stub implementation for at least one interface, the first interface class including a static member having a modifiable implementation pointer;
instantiating the stub implementation for the at least one interface to provide a stub
implementation object;
setting the modifiable implementation pointer of the static member of the first interface class to point to the stub implementation object;
loading a dynamic library, the dynamic library including a second interface class containing a real implementation of the at least one interface;
instantiating the real implementation of the at least one interface to provide a real implementation object; and
setting the modifiable implementation pointer of the static member of the first interface class to point to the real implementation object;
wherein the first interface class is a first enhanced singleton interface class and the second interface class is a second enhanced singleton class;
wherein the first enhanced singleton interface class comprises a first abstract C++ singleton interface class and the second enhanced singleton interface class comprises a second abstract C++ singleton interface class, wherein a first constructor associated with the main code segment is configured to set the modifiable implementation pointer of the static member of the first interface class to point to the stub implementation object, and a second constructor associated with the dynamic library is configured to set the modifiable implementation pointer of the static member of the first interface class to point to the real implementation object;
wherein the stub implementation comprises a first array of pointers, and the real implementation comprises a second array of pointers.

2. The method of claim 1, further comprising:
storing a copy of the modifiable implementation pointer upon setting the modifiable implementation pointer of the static member of the first interface class to point to the stub implementation object.

3. The method of claim 2, further comprising:
unloading the dynamic library and the real implementation of the at least one interface.

4. The method of claim 3, further comprising:
setting the modifiable implementation pointer to the copy of the modifiable implementation pointer.

5. A computer programming product, comprising:
a non-transitory computer-readable medium bearing
one or more instructions for loading a main code segment, the main code segment including a first interface class containing a stub implementation for at least one interface, the first interface class including a static member having a modifiable implementation pointer;
one or more instructions for instantiating the stub implementation for the at least one interface to provide a stub implementation object;
one or more instructions for setting the modifiable implementation pointer of the static member of the first interface class to point to the stub implementation object;
one or more instructions for loading a dynamic library, the dynamic library including a second interface class containing a real implementation of the at least one interface;
one or more instructions for instantiating the real implementation of the at least one interface to provide a real implementation object; and
one or more instructions for setting the modifiable implementation pointer of the static member of the first interface class to point to the real implementation object;
wherein the first interface class is a first enhanced singleton interface class and the second interface class is a second enhanced singleton class;
wherein the first enhanced singleton interface class comprises a first abstract C++ singleton interface class and the second enhanced singleton interface class comprises a second abstract C++ singleton interface class, wherein a first constructor associated with the main code segment is configured to set the modifiable implementation pointer of the static member of the first interface class to point to the stub implementation object, and a second constructor associated with the dynamic library is configured to set the modifiable implementation pointer of the static member of the first interface class to point to the real implementation object,
wherein the stub implementation comprises a first array of pointers, and the real implementation comprises a second array of pointers.

6. The computer programming product of claim 5, further comprising:
one or more instructions for storing a copy of the modifiable implementation pointer upon an execution of the one or more instructions for setting the modifiable implementation pointer of the static member of the first interface class to point to the stub implementation object.

7. The computer programming product of claim 6, further comprising:
one or more instructions for unloading the dynamic library and the real implementation of the at least one interface.

8. The computer programming product of claim 7, further comprising:
one or more instructions for setting the modifiable implementation pointer to the copy of the modifiable implementation pointer.

9. A system, comprising:
a computing device; and
instructions that when executed on the computing device cause the computing device to load a main code segment, the main code segment including a first interface class containing a stub implementation for at least one interface, the first interface class including a static member having a modifiable implementation pointer;
instantiate the stub implementation for the at least one interface to provide a stub implementation object;
set the modifiable implementation pointer of the static member of the first interface class to point to the stub implementation object;
load a dynamic library, the dynamic library including a second interface class containing a real implementation of the at least one interface;
instantiate the real implementation of the at least one interface to provide a real implementation object; and
set the modifiable implementation pointer of the static member of the first interface class to point to the real implementation object;
wherein the first interface class is a first enhanced singleton interface class and the second interface class is a second enhanced singleton class; wherein the first enhanced singleton interface class comprises a first abstract C++ singleton interface class and the second enhanced singleton interface class comprises a second abstract C++ singleton interface class, wherein a first constructor associated with the main code segment is configured to set the modifiable implementation pointer of the static member of the first interface class to point to the stub implementation object, and a second constructor associated with the dynamic library is configured to set the modifiable implementation pointer of the static member of the first interface class to point to the real implementation object;
wherein the stub implementation comprises a first array of pointers, and the real implementation comprises a second array of pointers.

10. The system of claim 9, further comprising:
one or more instructions that when executed on the computing device cause the computing device to store a copy of the modifiable implementation pointer upon an execution of one or more instructions to set the modifiable implementation pointer of the static member of the first interface class to point to the stub implementation object.

11. The system of claim 10, further comprising:
one or more instructions that when executed on the computing device cause the computing device to unload the dynamic library and the real implementation of the at least one interface.

12. The system of claim 11, further comprising:
one or more instructions that when executed on the computing device cause the computing device to set the modifiable implementation pointer to the copy of the modifiable implementation pointer.

* * * * *